United States Patent

[11] 3,553,528

| [72] | Inventor | Arpad Somlyody<br>Raritan, N.J. |
|---|---|---|
| [21] | Appl. No. | 752,557 |
| [22] | Filed | Aug. 14, 1968 |
| [45] | Patented | Jan. 5, 1971 |
| [73] | Assignee | Burroughs Corporation<br>Detroit, Mich.<br>a corporation of Michigan |

[54] LIGHT FLASHING CIRCUIT
9 Claims, 1 Drawing Fig.

[52] U.S. Cl. .................................................... 315/209,
315/77, 315/82, 315/83, 315/200, 315/201,
315/323; 340/81, 340/82, 340/83, 340/331,
340/332
[51] Int. Cl. ...................................................... H05b 37/02
[50] Field of Search........................................... 315/323,
213, 214, 215, 216, 217, 211, 77, 81, 82, 83, 200,
200.1, 201, 209; 340/81, 82, 83, 84, 331, 332

[56] References Cited
UNITED STATES PATENTS

| 3,421,049 | 1/1969 | Logan | 315/211 |
|---|---|---|---|
| 3,113,293 | 12/1963 | Breese et al. | 340/50 |
| 3,240,989 | 3/1966 | Grunwaldt | 315/77 |
| 3,263,119 | 7/1966 | Scholl | 315/81X |
| 3,313,981 | 4/1967 | Kratochvil | 340/82 |
| 3,376,472 | 4/1968 | Taylor et al. | 315/209X |
| 3,391,304 | 7/1968 | Fabry | 340/83X |

FOREIGN PATENTS

| 905,627 | 12/1962 | Great Britain | 315/215 |
|---|---|---|---|

Primary Examiner—John W. Huckert
Assistant Examiner—R. F. Polissack
Attorneys—Kenneth L. Miller and Robert A. Green

ABSTRACT: A light flashing circuit comprising a plurality of lamps to be turned on sequentially, each lamp being adapted to turn on at a different potential, with the various potentials being provided sequentially and repetitively in the circuit so that the sequence of flashing lights can be repeated as desired.

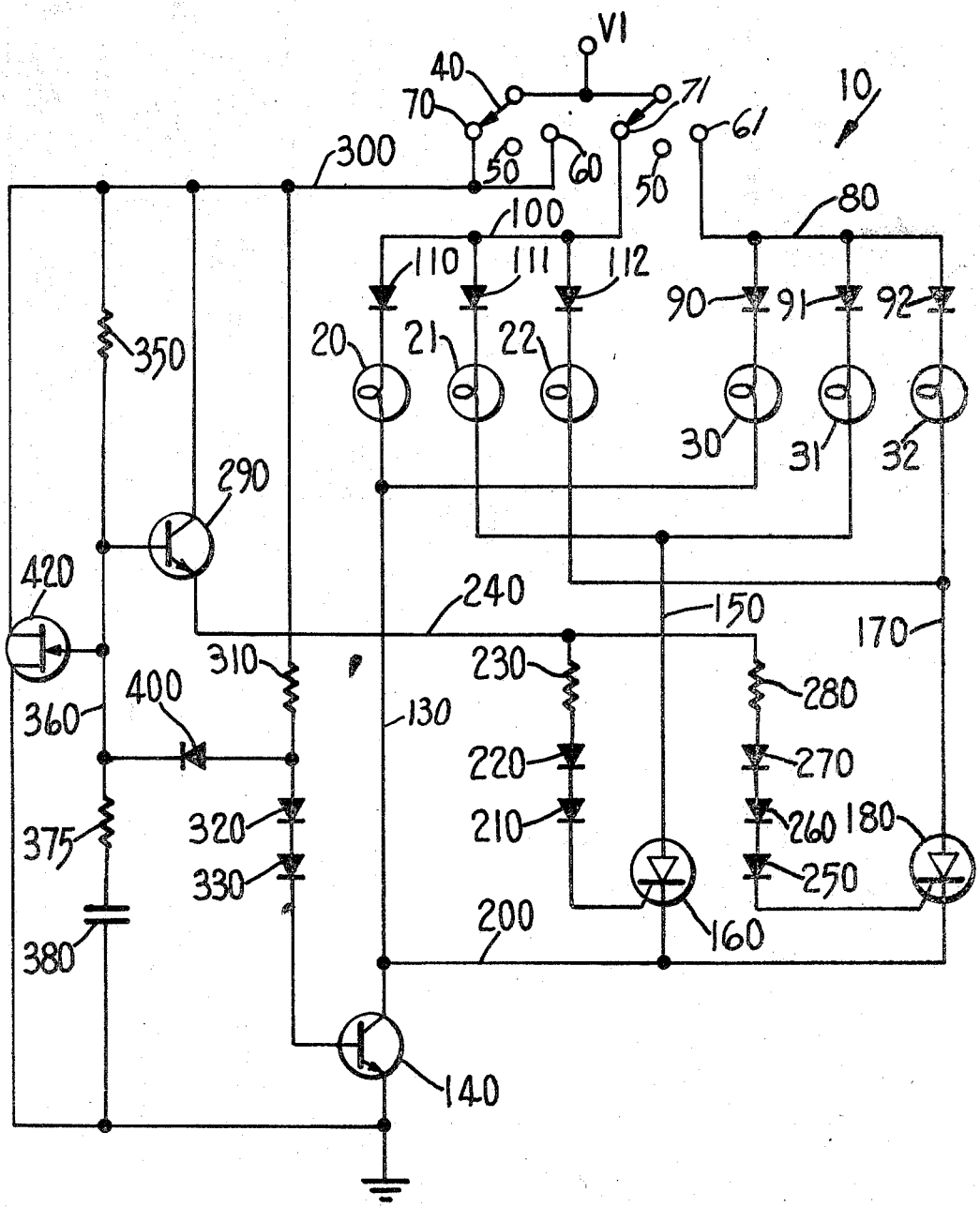
PATENTED JAN 5 1971
3,553,528
INVENTOR.
ARPAD SOMLYODY
BY
*Robert A. Green*
ATTORNEY 3,553,528

LIGHT FLASHING CIRCUIT

BACKGROUND OF THE INVENTION

Systems in which lights in a series are flashed on and off in sequence have been known, but only recently has this type of system been used in automobiles, particularly in the directional signaling lights. These automobile lighting systems as presently known are not all-electronic and are relatively complex and expensive.

SUMMARY OF THE INVENTION

Accordingly, with these prior art problems in mind, the invention contemplates a solution of these problems by providing a new and improved sequential light flashing circuit which is relatively inexpensive.

In addition, it is an object of the invention to provide an all electronic signal flashing circuit.

It is yet another object of this invention to provide a light flashing circuit including a plurality of groups of lights wherein the lights in any one group may be sequentially turned on and simultaneously and automatically turned off.

These and other objects are accomplished in a light flashing circuit including a plurality of lamps each having its own semiconductor switch, the respective switches each being responsive to a different electrical potential. The switches are sequentially activated by providing the different potentials and, after all the lamps are on, the potentials are simultaneously and automatically removed and the circuit may be recycled.

DESCRIPTION OF THE DRAWING

The single FIG. of the drawing is a schematic representation of a circuit embodying the invention.

DESCRIPTION OF THE PREFERRED EMBODIMENT

For purposes of illustration, it is assumed that the circuit of the invention 10 is adapted for use with automobile light assemblies, and is adapted to flash sequentially three lights 20, 21, 22 to indicate a right turn and three lights 30, 31, 32 to indicate a left turn. The circuit includes a positive power supply V1, for example, of the order of 12 V, which is adapted to be connected through a movable switch member 40, which is the turn signal indicator operated by the driver, to a neutral terminal 50, or to a pair of left turn terminals 60, 61 or a pair of right turn terminals 70, 71.

The left turn terminal 61 is connected to a bus 80 which is coupled through separate diodes 90, 91, 92, each poled with its anode toward the bus 80, to one side of each light 30, 31, 32, respectively. The right turn terminal 71 is connected to a bus 100 which is coupled through separate diodes 110, 111, 112, each poled with its anode toward the bus 100, to one side of each of the right turn lights 20, 21, 22, respectively. The other ends of each of the respective left turn and right turn lights are connected together, as described hereinafter. The first lamp in each sequence 20 and 30 is connected by a lead 130 to the collector of an NPN transistor 140, the emitter of which is connected to ground. The other sides (i.e., the side not connected to bus 80 or bus 100) of each of the lights which are in sequence, 21, 31 are connected together and by lead 150 to the anode of a three-electrode controlled rectifier 160, and the two lights 22, 32 which are third in sequence are connected together and by lead 170 to the anode of a second three-electrode controlled rectifier 180. The cathodes of the rectifiers 160 an 180 are connected together by lead 200 to the lead 130 and to the collector of transistor 140. The third electrode of rectifier 160 is connected through two diodes 210 and 220, each poled with its cathode toward rectifier 160, and a resistor 230 to a bus 240. The third electrode of rectifier 180 is connected through three diodes 250, 260, 270, each poled with its cathode toward rectifier 180, and a resistor 280 to the bus 240.

The bus 240 is connected to the emitter electrode of NPN transistor 290, the collector of which is connected to a bus 300 which leads through contacts 60 or 70 and switch 40 to the power supply V1. The power supply bus 300 is also coupled through a resistor 310 and two diodes 320 and 330, each poled with its anode toward power supply V1, to the base of transistor 140.

With respect to transistor 290, its collector is connected to the power supply bus 300, and its base is connected through a resistor 350 to the power supply bus 300, and through a lead 360 and a resistor 375 and capacitor 380 to ground. The lead 360 is also connected through a diode 400, poled with its cathode toward the base of transistor 290, 360 is also connected through a diode 400, to the junction of resistor 310 and the anode of first diode 320.

A unijunction transistor 420 is provided having its emitter connected to the lead 360, one base connected to the power supply bus 300, and its second base connected to ground.

In operation of the circuit 10, if turn signal indicator 40 engages neutral contacts 50, the circuit is deenergized. If turn signal indicator 40 engages contacts 60, 61, to indicate a left turn, transistor 140 is turned on because its base is connected directly to power supply V1. This causes light 30 to turn on, and at the same time, current flows through the path including resistors 350, 375, and this causes capacitor 380 to begin to charge, and, as it does, the voltage on the base of transistor 290 goes positive. The potential of the emitter of transistor 290 follows that of the base, and, at some positive potential, rectifier 160 fires, and light 31 goes on. As capacitor 380 continues to charge positive, the base and emitter of transistor 290 become more positive until rectifier 180 fires and light 32 goes on. It is noted that the rectifiers 160 and 180 are biased by their diodes (rectifier 160 by diodes 210, 220, and rectifier 180 by diodes 250, 260, 270) to fire at different potentials.

At some later time, the voltage at the base of transistor 290 reaches a level at which the unijunction transistor 420 fires and discharges capacitor 380 through the low impedance of resistor 375. The time constant of resistor 375 and capacitor 380 determines the duration of circuit reset or the time which elapses before the start of the next cycle of turn on of the lights 30, 31, 32. During reset, transistor 140 is turned off because lead 360 is at about ground potential, and this turns off the rectifiers 160 and 180 and the lamps.

The voltage on lead 360 goes positive due to its connection to V1, and, at some time, transistor 140 goes on again, and the cycle is repeated. If it is desired to turn on the lights to indicate a right turn, then the switch member 40 is moved to contact terminals 70 and 71. The operation of the circuit will be the same since each lamp of the right turn group of lamps (20,21,22) is connected in parallel with its respective lamp of the left turn group of lamps (30,31,32). Now, however, lamps 20, 21 and 22 are connected through contacts 70, 71 and switch 40 to power supply V1. The potentials firing the NPN transistor 140, rectifier 160 and rectifier 180, respectively, turn on lamps 20, 21 and 22 sequentially in the same manner that lamps 30, 31 and 32 were turned on when switch 40 was moved to contact terminals 60, 61. Furthermore the automatic removal of these potentials turns off lights 20, 21 and 22 simultaneously and the circuit recycles.

We claim:
1. A lamp flashing circuit comprising:
   a first series of lamps including first, second, and third lamps;
   a second series of lamps including fourth, fifth, and sixth lamps;
   said first and fourth lamps being connected as a first pair to a first current flow path which includes a first switch;
   said second and fifth lamps being connected as a second pair to a second current flow path which includes a second switch;
   said third and sixth lamps being connected as a third pair to a third current flow path which includes a third switch;
   means for turning each switch on at a different electrical potential;

means coupled to said switches for providing the electrical potentials for sequentially turning on said switches and either series of said lamps; and turn-off means coupled to said last-named means for simultaneously removing said potentials and for turning off all of said switches and said lamps.

2. Circuit defined in claim 1 wherein said last-named means comprises a capacitor and charging circuit therefor.

3. Circuit defined in claim 1 wherein said last-named means comprises a capacitor and charging circuit therefor, and said turn-off switch means comprises a transistor which is coupled to and discharges said capacitor when it turns on, said turn-off switch means being turned on when the capacitor reaches the proper charge level, the turn-on of said switch means discharging said capacitor and turning off said switches and said lamps.

4. A lamp flashing circuit comprising:
a plurality of lamps each having its own current flow path including semiconductor switching means;
each of said switching means being responsive to a different electrical potential for turning on its lamp;
electronic means for sequentially activating said switching means;
said activating means including means for providing said different electrical potentials to said switching means; and means coupled to said activating means for simultaneously removing said electrical potentials from each of said switching means thereby turning off said plurality of switching means and lamps.

5. The circuit of claim 4 wherein said potential removing means includes a timing circuit for removing said electrical potentials only after each of said switching means has been activated.

6. The circuit of claim 5 wherein said timing circuit is automatically reset for permitting said activating means to reactivate said switching means.

7. The circuit of claim 4 including a plurality of selectable groups, each of said groups including a said plurality of lamps, each with its own current flow path and wherein respective lamps in each of said groups utilize the semiconductor switching means, electronic activating means and potential removing means in common.

8. The circuit of claim 7 wherein said potential removing means includes a timing circuit for removing said electrical potentials only after each of said switching means has been activated.

9. The circuit of claim 8 wherein said timing circuit is automatically reset for permitting said activating means to activate said switching means.

UNITED STATES PATENT OFFICE
CERTIFICATE OF CORRECTION

Patent No. 3,553,528  Dated January 5, 1971

Inventor(s) Arpad Somlyody

It is certified that error appears in the above-identified patent and that said Letters Patent are hereby corrected as shown below:

Column 1, line 63, before "in sequence, 21, 31" insert -- second --. Column 2, line 13, cancel "360 is also con-"; line 14, cancel "nected through a diode 400,".

Signed and sealed this 13th day of April 1971.

(SEAL)
Attest:

EDWARD M. FLETCHER, JR.  WILLIAM E. SCHUYLER,
Attesting Officer  Commissioner of Patent